United States Patent [19]
Skoglund

[11] Patent Number: 5,931,186
[45] Date of Patent: Aug. 3, 1999

[54] FLUID FLOW CONTROL VALVE AND ACTUATOR FOR CHANGING FLUID FLOW RATE

[76] Inventor: Paul K. Skoglund, 2222 - 79th Ave. NE., Bellevue, Wash. 98004

[21] Appl. No.: 08/609,470

[22] Filed: Mar. 1, 1996

[51] Int. Cl.$^6$ .................................................. G05D 7/06
[52] U.S. Cl. ...................... 137/486; 137/487.5; 137/488; 137/504; 137/508; 251/343
[58] Field of Search ................................ 137/487.5, 508, 137/486, 488, 504; 251/343

[56] References Cited

U.S. PATENT DOCUMENTS

| | | |
|---|---|---|
| 824,425 | 6/1906 | Johnson . |
| 2,093,015 | 9/1937 | Madden . |
| 2,121,936 | 6/1938 | Thomas . |
| 2,351,035 | 6/1944 | Grant, Jr. et al. . |
| 2,655,935 | 10/1953 | Kinzbach . |
| 2,699,799 | 1/1955 | Wager . |
| 2,704,553 | 3/1955 | Verteuil . |
| 2,865,397 | 12/1958 | Chenault . |
| 3,100,620 | 8/1963 | Kates . |
| 3,122,162 | 2/1964 | Sands . |
| 3,357,448 | 12/1967 | Martin . |
| 3,402,735 | 9/1968 | Kates . |
| 3,433,262 | 3/1969 | Ray . |
| 3,446,227 | 5/1969 | Grayson . |
| 3,464,439 | 9/1969 | Budzich . |
| 3,478,776 | 11/1969 | Royer . |
| 3,503,417 | 3/1970 | Toda et al. . |
| 3,590,861 | 7/1971 | Chittenden et al. . |
| 3,593,742 | 7/1971 | Taylor . |
| 3,624,801 | 11/1971 | Gannon . |
| 3,643,685 | 2/1972 | Hays . |

(List continued on next page.)

FOREIGN PATENT DOCUMENTS

| | | |
|---|---|---|
| 44-4950 | 3/1963 | Japan . |
| 77/2626 | 2/1978 | South Africa . |
| 1228079 | 4/1971 | United Kingdom . |

OTHER PUBLICATIONS

"A Novel Approach to Flow Control for Chemical Injection and Continuous Sampling", M.S. Shelton, Society of Petroleum Engineers Publication No. 16910, pp. 329–338, Sep., 1987.

"Automatic Flow Rate Controllers", Kates Company, a Taub Company, no date.

"Primary Secondary Pumping Manual", ITT, 1968.

"Variable Speed/Variable Volume Pumping Fundamentals", ITT, no date.

"A Chilling Story of the Bridge", BRDG–TNDR Corp, no date.

"Design ED, EAD and EDR Control Valve Bodies", Fisher Corp., no date,

"Flow Control", Westinghouse, no date.

(List continued on next page.)

*Primary Examiner*—Stephen M. Hepperle
*Attorney, Agent, or Firm*—Seed and Berry LLP

[57] ABSTRACT

A fluid flow control valve and actuator therefor for changing fluid flow rate. A fluid flow control valve comprises a housing having a bore and an inlet and an outlet which form a flow passage through the housing. The valve also comprises a piston mounted in the bore, a fluid flow orifice communicating with the inlet and the outlet, springs which bias the piston toward the inlet, and a valve seat which is matable with the piston and is slidable within the housing to vary fluid flow rate. An actuator for changing fluid flow rate of the valve is comprised of a housing having a bore, a piston dividing the bore into a first chamber and a second chamber, springs in the second chamber for biasing the piston toward the first chamber, an actuator fluid inlet communicating with the first chamber, and an actuator fluid outlet communicating with the first chamber. The valve seat at least partially projects into the actuator second chamber and the actuator piston is adapted to slide within the bore to contact the valve seat upon application of a predetermined pressure of actuator fluid into the first chamber to slide the valve seat within the valve housing to vary fluid flow rate.

22 Claims, 3 Drawing Sheets

U.S. PATENT DOCUMENTS

| | | |
|---|---|---|
| 3,729,018 | 4/1973 | Butterfield . |
| 3,741,242 | 6/1973 | Hansen et al. . |
| 3,794,077 | 2/1974 | Fanshier . |
| 3,850,195 | 11/1974 | Olsson . |
| 3,872,884 | 3/1975 | Busdiecker et al. . |
| 3,958,596 | 5/1976 | Garrard . |
| 4,016,905 | 4/1977 | Marlatt, Sr. . |
| 4,059,128 | 11/1977 | Heske et al. . |
| 4,074,693 | 2/1978 | Kates . |
| 4,080,993 | 3/1978 | Lind, Jr. . |
| 4,092,998 | 6/1978 | Taplin . |
| 4,098,285 | 7/1978 | Karing . |
| 4,140,436 | 2/1979 | Schumacher et al. ............... 137/508 X |
| 4,167,262 | 9/1979 | Lemmon ......................... 137/487.5 X |
| 4,168,719 | 9/1979 | Renshaw . |
| 4,175,584 | 11/1979 | Rikuta . |
| 4,186,764 | 2/1980 | Ottersen et al. . |
| 4,230,147 | 10/1980 | Booth et al. . |
| 4,250,914 | 2/1981 | Ferrentino . |
| 4,250,915 | 2/1981 | Rikuta . |
| 4,277,832 | 7/1981 | Wong . |
| 4,383,549 | 5/1983 | Maldavs . |
| 4,413,652 | 11/1983 | Allewitz . |
| 4,431,020 | 2/1984 | Kowalski ........................ 137/487.5 X |
| 4,436,111 | 3/1984 | Gold et al. . |
| 4,508,140 | 4/1985 | Harrison . |
| 4,541,454 | 9/1985 | Sturman et al. . |
| 4,570,677 | 2/1986 | Roxton et al. . |
| 4,605,039 | 8/1986 | Johnson et al. . |
| 4,665,938 | 5/1987 | Brown et al. . |
| 4,724,865 | 2/1988 | Hirano et al. . |
| 4,796,661 | 1/1989 | Hishinuma et al. . |
| 4,840,191 | 6/1989 | Gausman et al. . |
| 4,874,066 | 10/1989 | Silberstein . |
| 4,893,649 | 1/1990 | Skoglund . |
| 4,898,200 | 2/1990 | Odajima et al. ................. 137/487.5 X |
| 4,922,956 | 5/1990 | Taube, Sr. et al. . |
| 4,961,441 | 10/1990 | Salter .............................. 137/487.5 X |
| 5,004,008 | 4/1991 | Drucker . |
| 5,022,438 | 6/1991 | Faraon-Chaul . |
| 5,054,516 | 10/1991 | Okerblom . |
| 5,085,246 | 2/1992 | Griinke . |
| 5,101,854 | 4/1992 | Bron . |
| 5,143,116 | 9/1992 | Skoglund . |
| 5,234,025 | 8/1993 | Skoglund et al. . |
| 5,251,655 | 10/1993 | Low . |
| 5,280,805 | 1/1994 | Skoglund . |
| 5,301,713 | 4/1994 | Skoglund . |
| 5,487,405 | 1/1996 | Skoglund . |

OTHER PUBLICATIONS

"Air Handling Unit–Coil Piping 3–Way Valve Control", no date.

"Specification Sheet No. 428DP–CP", Bailey, no date.

"Two–Way Valve Cast Iron Flanged", Sauter, no date.

"Basic System Control and Valve Sizing Procedures", ITT, 1965.

FLUID FLOW CONTROL VALVE AND ACTUATOR FOR CHANGING FLUID FLOW RATE

BACKGROUND OF THE INVENTION

The present invention pertains to valves that control fluid flow rate, and more specifically pertains to actuators for changing the fluid flow rate of the aforesaid valves.

Fluid flow control valves are generally known in the art. More specifically, U.S. Pat. Nos. 4,893,649, 5,143,116, and 5,234,025, all issued to Skoglund, generally disclose valves which provide a constant fluid flow despite upstream pressure fluctuations. Additionally, it is known in the art to alter the desired fluid flow rate through the valve by varying the fluid stream through the valve with a mechanism that requires hands-on adjustment. Thus, the prior art fluid flow control valves must be easily accessible if the fluid flow rate is to be varied.

However, valves which provide constant fluid flow rate are often necessarily employed in hostile or inaccessible environments such as, for example, in offshore, undersea oil drilling platforms, in nuclear reactors where a high level of radioactivity exists, in chemical plants where toxic chemicals are employed, and sealed in the walls, floors and/or ceilings of commercial and residential buildings.

Furthermore, the mechanical actuators known in the art, because they require hands-on adjustment, often do not provide the desired accuracy of fluid flow rate control. The only way to ensure the requisite accuracy of fluid flow rate control is to remove the requirement for humans to manually adjust the actuator mechanism.

A need thus exists for a fluid flow control valve having an actuator for changing fluid flow rate wherein the actuator can be remotely controlled from a distant location so that the valve can be employed in hazardous and inaccessible locations.

A need also exists for the above type of valve and actuator where the fluid flow rate control by the actuator is facilitated by pressurized fluid which causes movement of the actuator, thus providing a more accurate control of actuator movement than can be accomplished by manual adjustment.

A need further exists for the above type of valve and actuator where solenoid valves control the passage of fluid into the actuator and the passage of fluid out of the actuator, and wherein the solenoid valves are remotely controlled.

An additional need exists for the above type of valve and actuator where a differential pressure transducer communicates with a plurality of locations within the valve to monitor pressure differences within the valve.

A need also exists for a valve and actuator wherein the actuator is spring-biased, and the springs have a preload bias equivalent to the ambient pressure of the actuator fluid such that the actuator can function in high pressure environments with which the actuator fluid is in equilibrium.

SUMMARY OF THE INVENTION

A fluid flow control valve and actuator therefor for changing fluid flow rate are discussed. A fluid flow control valve comprises a housing having a bore and an inlet and an outlet which form a flow passage through the housing. The valve also comprises a piston mounted in the bore, a fluid flow orifice communicating with the inlet and the outlet, springs which bias the piston toward the inlet, and a valve seat which is matable with the piston and is slidable within the housing to vary fluid flow rate. An actuator for changing fluid flow rate of the valve is comprised of a housing having a bore, a piston dividing the bore into a first chamber and a second chamber, springs in the second chamber for biasing the piston toward the first chamber, an actuator fluid inlet communicating with the first chamber, and an actuator fluid outlet communicating with the first chamber. The valve seat at least partially projects into the actuator second chamber and the actuator piston is adapted to slide within the bore to contact the valve seat upon application of a predetermined pressure of actuator fluid into the first chamber to slide the valve seat within the valve housing to vary fluid flow rate.

Most preferably, the valve of the present invention also comprises a remote controllable actuator fluid inlet valve and a remote controllable actuator fluid outlet valve which are solenoid valves. In order to decrease fluid flow through the valve, the actuator fluid inlet valve is opened and the actuator fluid outlet valve is closed, thereby increasing fluid pressure in the first chamber of the actuator to slide the actuator piston toward the valve seat in the second chamber to move the valve seat toward the valve piston. In order to increase fluid flow through the valve, the actuator fluid inlet valve is closed and the actuator fluid outlet valve is opened, thereby decreasing fluid pressure in the first chamber above the actuator piston to cause the actuator piston to move toward the first chamber and away from the valve seat in the second chamber due to the spring bias toward the first chamber on the actuator piston. The fluid flow pressure slides the valve seat toward the actuator piston and away from the valve piston to increase fluid flow.

The valve of the present invention also preferably includes a differential pressure transducer communicating with the bore to monitor pressure differences between the first chamber and the second chamber.

The springs of the actuator preferably provide a preload bias equivalent to the ambient pressure of the actuator fluid, the preload bias most preferably being between about 100 p.s.i. and about 3000 p.s.i.

BRIEF DESCRIPTION OF THE DRAWINGS

These and other features of the present invention will be more fully appreciated when considered in light of the following specification and drawings in which.

DESCRIPTION OF THE PREFERRED EMBODIMENT

The novel features believed to be characteristic of this invention are set forth in the appended claims. The invention itself, however, may best be understood and its various objects and advantages best appreciated by reference to the detailed description below in connection with the accompanying drawings.

Figure 1:
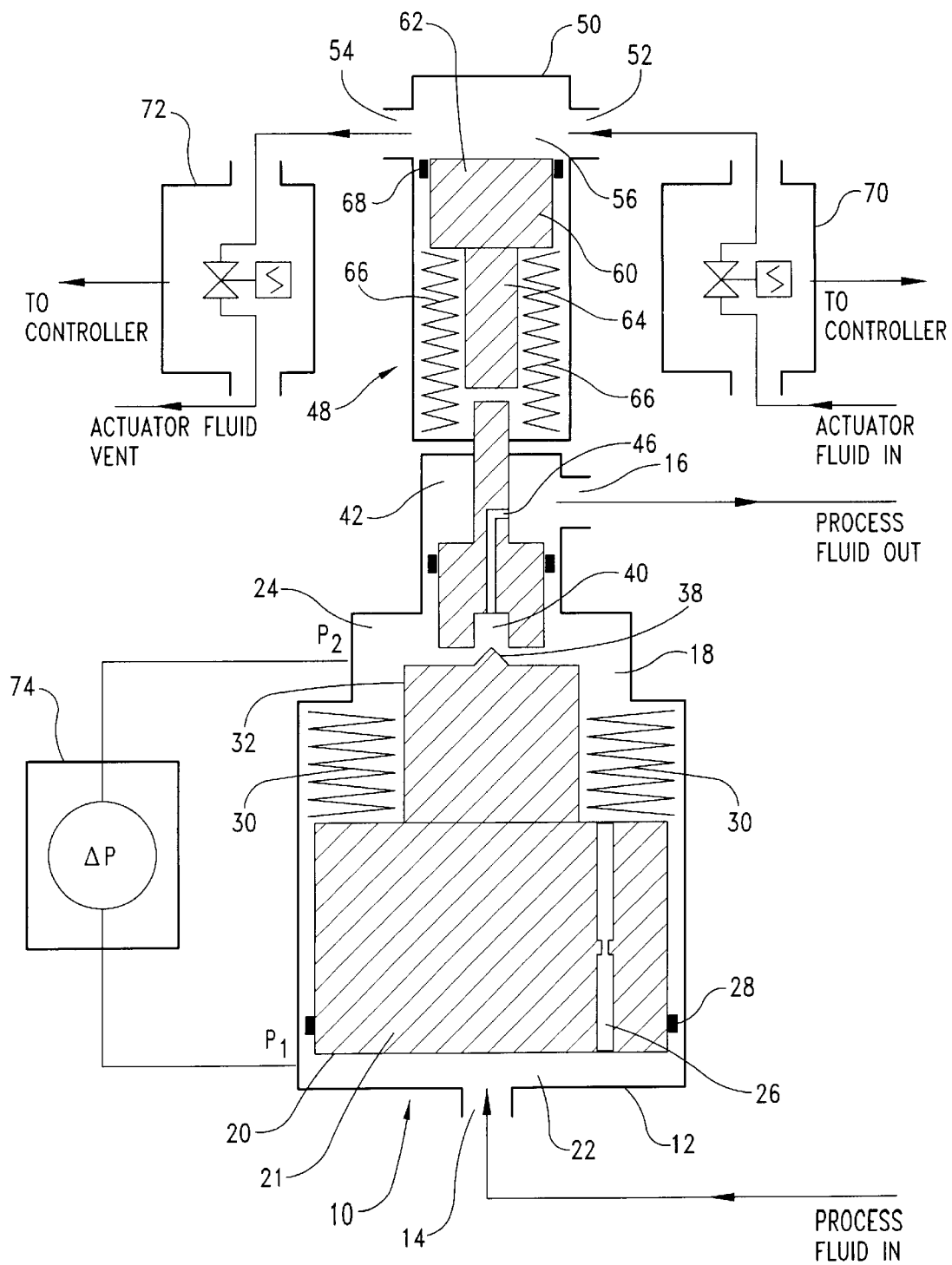
FIG. 1 is a schematic view of an exemplary system employing the fluid flow control valve and actuator for changing valve fluid flow rate of the present invention.
Figure 2:
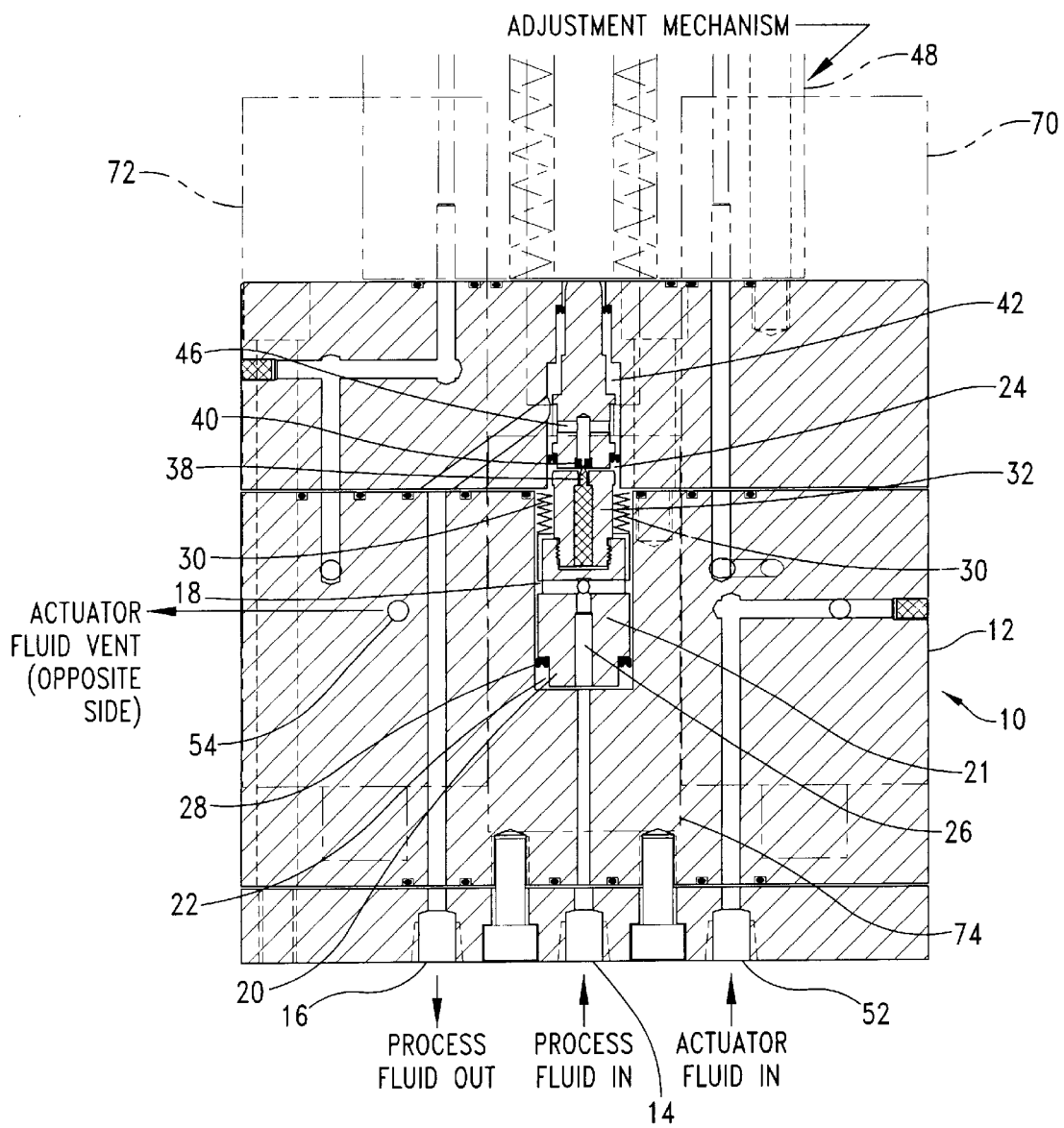
FIG. 2 is an exposed view of the fluid flow control valve of the present invention.

Referring to FIGS. 1 and 2, the reference numeral 10 indicates the constant flow rate controller valve, as a whole. Valve 10 has a valve body 12 having at its top portion an inlet port 14, and having at its bottom portion an outlet port 16. A bore 18 is formed within valve body 12; the bore 18 is defined by an elongated cylinder of decreased diameter at its lower portion.

A piston 20 having a head 21 is disposed within bore 18 such that a portion of bore 18 is divided into chamber 22 above piston head 21 and chamber 24 below piston 20. Piston 20 is of a generally cylindrical configuration. Chambers 22 and 24 are sized to be of relatively small area to minimize the amount of "fluid packing" in the invention. "Fluid packing" relates to the amount of fluid in the valve. If less flow is present in the valve, fluid compressibility will not delay the response time of the valve to pressure fluctuations.

When applicant's device is used in a high pressure, low volume environment (e.g., 5000 p.s.i. and 0.5 gallons per day), the sole flow path through the constant flow rate controller valve 10 is an axial flow path through the piston 20. No other paths are present, such as fluid flow around the periphery of piston 20, thus allowing the invention to operate in high pressure, low flow environments. However, for use in low pressure, high flow environments (e.g., 20 p.s.i. and 100 gallons per day), fluid flow around the periphery of piston 20 may occur. This axial flow path within piston 20 is an orifice 26 that permits the flow of fluid or gas from chamber 22 through piston 20 and into chamber 24. However, orifice 26 need not pass through piston 20, but may connect chambers 22 and 24 by passing through valve housing 12 instead.

In order to prevent fluid or gas flow around the periphery of piston 20 when this invention is employed in high gas or fluid pressure environments, seal 28 is placed around the periphery of piston 20. Seal 28 is preferably a cup seal. Seal 28 is optional when the invention is used in a low pressure environment. When used in a low pressure environment, seal 28 may be a diaphragm seal.

Within chamber 24 are springs 30 which contact piston 20 and bias piston 20 upwardly toward chamber 22. Springs 30 may specifically be Bellville washer type springs, manufactured by Key Bellville, Inc., Box 1916, Leechburg, Pa. 15656, may be another washer type spring, or may be another type of spring, such as a coil type spring for example. By employing washer type springs for springs 30, the desired flow rate may be conveniently altered by stacking additional washer type springs to vary the spring force present in chamber 24 of the constant flow rate controller valve 10, thus changing the pressure differential across the piston.

Piston shaft 32 is a relatively narrowed cylindrical structure located on the bottom portion of piston 20. Pin 38 has a small surface area, and is conical in shape to incrementally vary the flow rate of the fluid exiting chamber 24 to achieve the desired initial flow rate, as detailed more fully below.

Sized to fit within exit channel 42 is pin valve seat 40, which is also sized to seat pin 38. Fluid path 46 is an axial flow path within pin valve seat 40, which accommodates gas or fluid flow from chamber 24 to outlet port 16 when pin 38 is not seated in pin valve seat 40. Fluid path 46 is of a substantially narrower diameter than exit channel 42 to minimize "fluid packing", as discussed above.

Fluid flow rate may be varied by adjustment of adjustment mechanism 48, described further below, which contacts the bottom portion of pin valve seat 40 and slidably varies the position of pin valve seat 40 within exit channel 42. The force exerted by springs 30 may thus be increased or decreased because the change in position of pin valve seat 40 changes the distance piston 20 must travel to seat pin 38 in pin valve seat 40. In this manner, the change in spring tension of spring 30 varies the spring force on piston 20, thus varying the pressure differential between chamber 22 and chamber 24.

The constant flow rate controller valve 10 operates based on the following force balance equations:

$$P_1 \cdot A_{piston} = (P_2 \cdot A_{piston}) + KX + (A_{pin} \cdot P_{out})$$

Where
  $P_1$=pressure in chamber 22
  $A_{piston}$=surface area of piston 20
  $P_2$=pressure in chamber 24
  $KX$=spring force of springs 30
  $A_{pin}$=surface area of pin 38 which mates with seat 40
  $P_{out}$=pressure at outlet port 16

Rearrangement of terms produces the equation $$P_1 - P_2 / A_{piston} = KX + (A_{pin} \cdot P_{out})$$

Because $A_{pin}$ is negligible in comparison to $A_{piston}$, and assuming $P_2$ equals the flow pressure at outlet port 16, the following equation characterizes the force balance existing in the present invention.

$$P_1 - P_2 / A_{piston} = KX$$

Thus, the differential pressure $(P_1-P_2)$ is a function of spring force (KX).

The flow rate of water, for example, through the constant flow rate controller valve 10 is defined by the following equation:

$$q = R\sqrt{P_1 - P_2}$$

Where
  q=flow rate
  $P_1$=pressure in chamber 22
  $P_2$=pressure in chamber 24
  R=flow resistance across orifice 26

Note that because differential pressures $(P_1-P_2)$ is a function of spring force (KX), flow rate (q) is also a function of spring force. Thus, the constant flow rate controller valve 10 has a constant flow as long as spring force remains constant. This flow is constant regardless of the flow pressure at inlet port 14. Theoretically, there is a pressure force exerted on the pin 38 and against the piston 20 defined by $$P_{out} \cdot A_{pin}$$

Where
  $P_{out}$=pressure at outlet port 16
  $A_{pin}$=surface area of pin 38

However, the above force is negligible due to the small surface area of pin 38 when compared to the surface area of piston 20. Thus, flow rate is constant regardless of the flow pressure at outlet port 16. Note that this force would not be negligible and the flow rate would not be constant if, in the present invention, the area of the pin 38 was not small in value when compared to the surface area of piston 20.

The constant flow rate controller valve 10 operates as follows. Gas or fluid passes through inlet port 14 and enters chamber 22. Piston 20, which is biased by springs 30 towards chamber 22, is pushed toward chamber 24 by the increased pressure in chamber 22, thus seating pin 38 in pin valve seat 40. The seating of pin 38 in pin valve seat 40 blocks flow to flow path 46 and outlet port 16. Chamber 24 is thus sealed.

Gas or fluid flows from chamber 22 into chamber 24 via orifice 26, and the flow pressure in chamber 24 increases.

When the flow pressure in chamber 24 plus the spring force of spring 30 exceeds the pressure in chamber 22, piston 20 is pushed towards chamber 22 and pin 38 is unseated from pin valve seat 40. A piston equilibrium position is next attained when the flow pressure in chamber 22 equals the flow pressure in chamber 24 plus the spring force of spring 30.

The above piston equilibrium position also provides the desired flow rate. Without further substantial change in the position of piston 20, the flow rate will remain constant despite flow pressure changes because the spring force of springs 30 maintains a constant pressure differential between chamber 22 and chamber 24.

Figure 3:
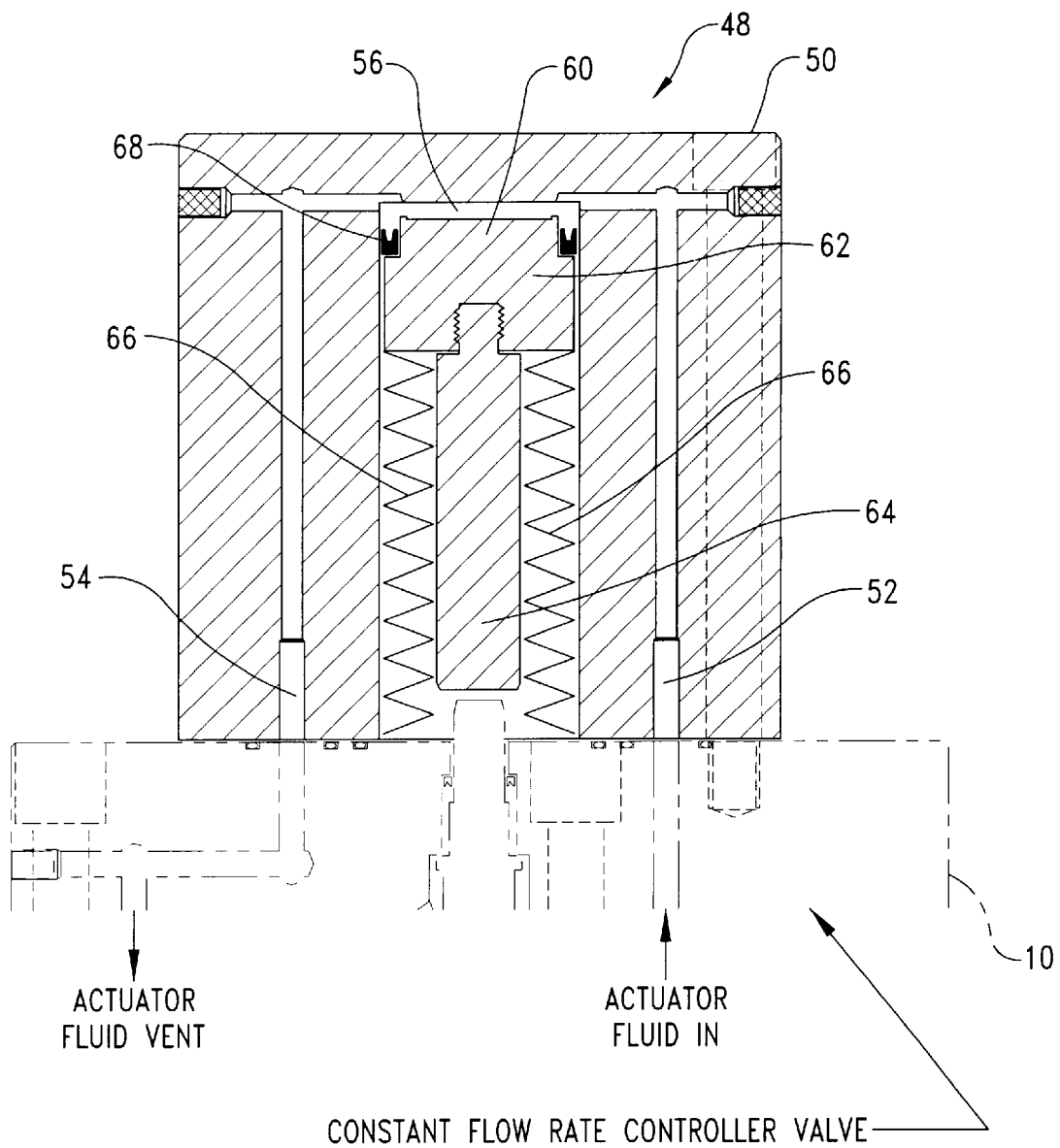
FIG. 3 is an exposed view of the actuator for changing valve fluid flow rate of the present invention.

Now referring to FIGS. 2 and 3, actuator mechanism 48 will be described in detail. Actuator mechanism 48 includes an actuator body 50 having an actuator fluid inlet 52 and an actuator fluid outlet 54 communicating with actuator bore 56. Actuator piston 60 slidably resides in actuator bore 56 and divides actuator bore 56 into a first chamber communicating with actuator fluid inlet 52 and actuator fluid outlet 54 and a second chamber in which pin valve seat 40 partially resides. More specifically, coaxial openings in the portion of exit channel 42 of valve 10 containing pin valve seat 40 and the portion of actuator body 50 defining the second chamber thereof allows pin valve seat 40 to partially pass through exit channel 42 and partially reside within the second chamber of actuator bore 56. Actuator piston 60 is divided into actuator piston head 62 and actuator piston rod 64. Actuator piston rod 64 is oriented to contact the portion of pin valve seat 40 residing in the second chamber of actuator bore 56 upon sliding reciprocation of valve piston 60 in actuator bore 56 in order to slidably move pin valve seat 40 within exit channel 42 of valve 10 in order to alter the fluid flow rate through valve 10. Actuator springs 66, located in the second chamber of actuator bore 56, bias actuator piston 60 toward the first chamber of actuator bore 56 and toward actuator fluid inlet 52 and actuator fluid outlet 54. When the subject invention is configured for operation in an environment, such as an undersea location, where the actuator fluid is under high pressure in order to be in equilibrium with the high pressure environment, actuator springs 66 have a preload bias approximately equivalent to the ambient pressure of the actuator fluid, for example between about 100 p.s.i. and 3000 p.s.i., and preferably about 1000 p.s.i. Cup seal 68 is preferably located between actuator piston 60 and actuator body 50 in order to provide a fluid-tight environment in which actuator piston 60 reciprocates.

Actuator fluid enters actuator fluid inlet 52 through input solenoid valve 70, and actuator fluid exits actuator fluid outlet 54 to subsequently enter output solenoid valve 72. Input solenoid valve 70 and output solenoid valve 72 preferably can be remotely controlled by a controller (not shown) that is located a predetermined distance from input solenoid valve 70 and output solenoid valve 72, and the actuator mechanism 48 as a whole, in order for the subject invention to be employed in inaccessible or hazardous locations. More specifically, the input solenoid valve 70 and output solenoid valve 72 can be electrically wired to the controller, or can receive RF signals from the controller. Input solenoid valve 70 and output solenoid valve 72, when remotely controllable, receive electrical commands from the controller in order to open or close input solenoid valve 70 and output solenoid valve 72. For example, input solenoid valve 70 may be Solenoid Valve Model No. 2/2 DS25MG manufactured by Bournemouth Industrial Supplies of Dorset, England.

Differential pressure transducer 74 may optionally communicate with chamber 22 and chamber 24 of valve 10 in order to monitor any pressure differences present within valve 10 such that the fluid flow rate can be modified by employed actuator mechanism 48 based on the data received from differential pressure transducer 74. Most preferably, differential pressure transducer 74 communicates remotely with the above-mentioned controller or other remotely located receiver. For example, differential pressure transducer 74 may be Pressure Transducer Model No. P488-0115 manufactured by Lucas Control Systems Products of Hampton, Va.

In operation, in order to decrease fluid flow through valve 10, input solenoid valve 70 is opened and output solenoid valve 72 is closed, thereby increasing fluid pressure in the first chamber of actuator bore 56 such that pressure on actuator piston head 62 slides actuator piston 60 toward pin valve seat 40, which partially resides in the second chamber of actuator bore 56, thus sliding pin valve seat 40 toward valve piston 20. In order to increase fluid flow through valve 10, input solenoid valve 70 is closed and output solenoid valve 72 is opened, thereby decreasing fluid pressure in the first chamber of actuator bore 56 such that the pressure on actuator piston head 62 is decreased to cause actuator piston 60 to move toward the first chamber of actuator bore 56 and away from pin valve seat 40 in the second chamber of actuator bore 56 due to the spring bias toward the first chamber of actuator bore 56 on actuator piston 60 by actuator springs 66. Because the contact between pin valve seat 40 and actuator piston 60 is the major support of pin valve seat 40 against the pressure of the fluid flowing through valve 10, pin valve seat 40 will slide toward actuator piston rod 64 as actuator piston 60 moves away from valve piston 20.

While particular embodiments of the present invention have been described in some detail herein above, changes and modifications may be made in the illustrated embodiments without departing from the spirit of the invention.

I claim:

1. A fluid flow control valve comprising:
   a housing having a first bore and having an inlet and an outlet forming a flow passage through said housing;
   a first piston mounted in said first bore;
   a fluid flow orifice communicating with the inlet and the outlet;
   spring means biasing said first piston toward the inlet;
   a valve seat matable with said first piston, said valve seat slidable within said housing to vary fluid flow rate; and
   an actuator for changing fluid flow rate comprising a housing having a second bore, a second piston dividing said second bore into a first chamber and a second chamber, spring means in said second chamber biasing said second piston toward said first chamber, an actuator fluid inlet communicating with said first chamber, an actuator fluid outlet communicating with said first chamber, said valve seat at least partially projecting into said second chamber, said second piston adapted to slide within said second bore to contact said valve seat upon application of a predetermined pressure of actuator fluid into said first chamber to slide said valve seat within said valve housing to vary fluid flow rate.

2. The valve of claim 1 further comprising a remote controllable actuator fluid inlet valve.

3. The valve of claim 2 wherein said remote controllable actuator fluid inlet valve is a solenoid valve.

4. The valve of claim 1 further comprising a remote controllable actuator fluid outlet valve.

5. The valve of claim 4 wherein said remote controllable actuator fluid outlet valve is a solenoid valve.

6. The valve of claim 1 wherein the first piston divides the first bore into first and second valve chambers, and further comprising a differential pressure transducer communicating with said first and second valve chambers to monitor pressure differences between said first valve chamber and said second valve chamber.

7. The valve of claim 1 wherein said spring means of said actuator provides a preload bias equivalent to the ambient pressure of the actuator fluid.

8. The valve of claim 7 wherein the preload bias is between 100 p.s.i. and 3000 p.s.i.

9. An actuator for changing fluid flow rate in a fluid flow control valve in which fluid flow rate is altered by a valve seat slidable in a valve housing, said actuator comprising:

a housing having a bore;

a piston dividing said bore into a first chamber and a second chamber;

spring means in said second chamber biasing said piston toward said first chamber;

an actuator fluid inlet communicating with said first chamber;

an actuator fluid outlet communicating with said first chamber such that application of a predetermined pressure of actuator fluid into said first chamber slides said piston toward said second chamber in which the valve seat resides and into contact with the valve seat to slide the valve seat within the valve housing to vary fluid flow rate.

10. The actuator of claim 9 further comprising a remote controllable actuator fluid inlet valve.

11. The actuator of claim 10 wherein said remote controllable actuator fluid inlet valve is a solenoid valve.

12. The actuator of claim 9 further comprising a remote controllable actuator fluid outlet valve.

13. The actuator of claim 12 wherein said remote controllable actuator fluid outlet valve is a solenoid valve.

14. The actuator of claim 9 further comprising a differential pressure transducer communicating with the first and second chambers of the valve to monitor pressure differences between the first chamber and the second chamber of the valve.

15. The actuator of claim 14 wherein said spring means of said actuator provides a preload bias equivalent to the ambient pressure of the actuator fluid.

16. The actuator of claim 15 wherein the preload bias is between 100 p.s.i. and 3000 p.s.i.

17. An actuator for changing fluid flow rate in a fluid flow control valve in which fluid flow rate is altered by a valve seat slidable in a valve housing, said actuator comprising:

a housing having a bore;

a piston dividing said bore into a first chamber and a second chamber;

spring means in said second chamber biasing said piston toward said first chamber;

an actuator fluid inlet communicating with said first chamber;

an actuator fluid outlet communicating with said first chamber;

remote controllable actuator fluid inlet valve means; and remote controllable actuator fluid outlet valve means such that opening said inlet valve means and closing said outlet valve means provides a predetermined pressure of actuator fluid into said first chamber to slide said piston toward said second chamber in which the valve seat resides and into contact with the valve seat to slide the valve seat within the valve housing to vary fluid flow rate.

18. The actuator of claim 17 wherein said remote controllable actuator fluid inlet valve is a solenoid valve.

19. The actuator of claim 17 wherein said remote controllable actuator fluid outlet valve is a solenoid valve.

20. The actuator of claim 17 further comprising a differential pressure transducer communicating with the first and second chambers of the valve to monitor pressure differences between the first chamber and the second chamber of the valve.

21. The actuator of claim 17 wherein said spring means of said actuator provides a preload bias equivalent to the ambient pressure of the actuator fluid.

22. The actuator of claim 21 wherein the preload bias is between 100 p.s.i. and 3000 p.s.i.

* * * * *